United States Patent [19]

Etzel et al.

[11] Patent Number: 5,287,412
[45] Date of Patent: Feb. 15, 1994

[54] ARRANGEMENT FOR REPRODUCING BASS TONES IN A VEHICLE

[75] Inventors: Hubert Etzel, Landau a.d. Isar; Jörg Prokisch, Schwarzach; Rüdiger Fleischer, Grafling; Edgar Kirk, München, all of Fed. Rep. of Germany

[73] Assignee: Nokia (Deutschland) GmbH, Pforzheim, Fed. Rep. of Germany

[21] Appl. No.: 905,282

[22] Filed: Jun. 26, 1992

[30] Foreign Application Priority Data

Jun. 28, 1991 [DE] Fed. Rep. of Germany ....... 4121408

[51] Int. Cl.⁵ ............................................. H04B 1/00
[52] U.S. Cl. ........................................ 381/86; 381/88; 381/159; 181/156; 297/113
[58] Field of Search ................. 181/156, 141, 150; 381/86, 88, 90, 188, 205, 159, 154, 76, 120, 76; 297/113, 194, 217

[56] References Cited

U.S. PATENT DOCUMENTS 2,085,836  6/1937  Tatum ................................. 297/113
4,435,011  3/1984  Hakamata .......................... 297/113
4,580,653  4/1986  Owens ................................ 181/156
4,667,979  5/1987  Wolff .

FOREIGN PATENT DOCUMENTS 187346    12/1985  European Pat. Off. .
3317518    5/1983  Fed. Rep. of Germany ...... 381/159
3902437    8/1990  Fed. Rep. of Germany .
2423944   12/1979  France ................................ 381/88
55-793197  6/1980  Japan .
9101544    2/1991  PCT Int'l Appl. .
1392609   11/1971  United Kingdom .

Primary Examiner—Forester W. Isen
Assistant Examiner—Mark D. Kelly
Attorney, Agent, or Firm—Ware, Fressola, Van Der Sluys & Adolphson

[57] ABSTRACT

A sub-woofer arrangement for the reproduction of bass tones is provided in an armrest of a seat of a passenger car. The sub-woofer arrangement has a sound outlet orifice positioned so as to face a dashboard when lowered in a first position and be unobstructed when raised into a second position in a recess within the seat.

5 Claims, 2 Drawing Sheets

ARRANGEMENT FOR REPRODUCING BASS TONES IN A VEHICLE

BACKGROUND OF THE INVENTION

1. Field of the Invention

The present invention relates to reproduction of low frequency tones, and more particularly to an arrangement for reproducing bass tones within the passenger area of vehicles, namely automobiles.

2. Description of the Prior Art

The transmission of low and very low tone audio frequencies is accomplished by electro-acoustic transducers, commonly called loudspeakers or drivers. These transducers are arranged in an essentially closed loudspeaker enclosure so as to provide a good acoustic pattern for reproducing high quality, low frequency sound.

One type of enclosure for the production of a low frequency tone is a bass reflex enclosure. In a bass reflex enclosure, a loudspeaker is installed in an outer surface of a loudspeaker housing in a manner so that a front side of a diaphragm of the loudspeaker radiates directly into the volume of a surrounding environment. An additional radiation orifice is provided in the housing which acts as a phase angle rotator at a specific frequency range. The additional radiation orifice directs a resonance pattern of air volume and acoustic mass from a back side of the diaphragm of the loudspeaker so as to effectively add the acoustic energy radiated from the front and back sides of the diaphragm.

In another low frequency tone reproduction arrangement, a twin chamber enclosure arrangement, the interior of a loudspeaker enclosure housing is partitioned into two volumes which may be of equal or different size. A loudspeaker is fitted in the partition. Sound projection is effected through an opening that connects one of the two volumes with the outside environment. This arrangement can reproduce high quality bass tones with a smaller enclosure than a bass reflex arrangement. An acoustic filter effect is achieved with the twin chamber arrangement because the arrangement acts as a Helmholtz resonator having a second order band-pass transmission characteristic. The net sound from the twin chamber arrangement comprises only sound radiated by a bass reflex channel. By appropriate absolute and relative sizing of the two volumes, a very low, and within certain limits, an arbitrarily broad-band tuning can be accomplished in combination with a suitable loudspeaker. See L. R. Fincham, *A Bandpass Loudspeaker Enclosure*, KEF Electronics Limited, Maidstone, England. The bass tone transmission can be limited to an exceptionally low frequency spectrum by merely tuning the two different resulting resonance frequencies of the enclosure.

Thus, an advantage of the twin chamber enclosure arrangement is that it can be made considerably smaller than a bass reflex enclosure yet still provide the same sound quality. In situations where a sub-woofer is used with the stereophonic reproduction of sound signals, it is possible to dispense with the provision of a separate bass enclosure for each channel if the loudspeaker fitted in the partition is designed as a double-coil loudspeaker. Reproduction of bass audio signals by a sub-woofer enclosure is possible because such enclosures are fitted with a low-pass filter (cross-over) with a very low limiting frequency so as to filter out all but the low frequency audio signals for reproduction. The consequence of the low frequency filtration is that in this low frequency range, the human ear is no longer able to localize the source transmitting the low-frequency sound. Because the twin-chamber arrangement acoustically has second order band-pass transmission characteristics, highly effective frequency filtration is possible even with simple filters.

Like bass reflex arrangements, sub-woofer enclosure arrangements require at least seven liters of volume for an acceptable sound reproduction. Because this minimum volume requirement typically does not allow placement of the sub-woofer in an interior passenger area of a car, some car manufacturers place the sub-woofer enclosure arrangement in a trunk and feed sound outlet orifices into the passenger area. However, such placement can be expensive and because the sub-woofer enclosure arrangement is present in the trunk, the useful volume of the trunk is reduced.

Some sub-woofer enclosure arrangements are placed under the front seat of a car. There are some disadvantages to this positioning in that servomotors for electrical seat adjustment are also placed under the front seat. Even if there is space remaining for a sub-woofer enclosure arrangement, different enclosure housings have to be designed for each car manufacturer and each model of car in order to make optimum use of the residual space.

SUMMARY OF THE INVENTION

The present invention provides an arrangement for the reproduction of low frequency bass tones. The arrangement can be operated as a sub-woofer in the interior passenger area of a variety of cars. The sub-woofer has an enclosure which is dimensioned so as to be the equivalent in size to an armrest of a passenger seat in a car and so as to replace existing armrests.

The interior of the sub-woofer enclosure is partitioned into a first and second volume or chamber. An opening is provided in the partition and a loudspeaker having a first and second side is positioned proximal to the opening so as to radiate sound from its first side into the first volume. An interior wall is positioned in a portion of the second volume so as to create a bass reflex channel. A sound outlet orifice is provided on the enclosure proximal to the wall so as to provide an outlet for sound from the bass reflex channel within the second volume to the passenger compartment. The sound outlet orifice is also positioned on a portion of the sub-woofer enclosure so as to permit the outlet of sound in the direction of the dashboard of a vehicle when the sub-woofer enclosure is in a lowered horizontal position. The outlet is also positioned on the enclosure so as to permit the outlet of sound when the sub-woofer is in a raised vertical position within a recess of a seat element which is designed to receive an armrest. The positioning is designed so as to prevent the recess from covering or closing the sound outlet when raised to the vertical position.

In another embodiment, an amplifier is positioned on the wall within the second volume. The amplifier is connected to a source of electrical power and electrical audio signals by a cable extending through the enclosure into its interior. The loudspeaker is electrically connected to the amplifier. The wall is at least partially fabricated from sheet metal so as to allow the dissipation of heat by ventilation through the bass reflex channel.

DETAILED DESCRIPTION OF THE PRESENT INVENTION

Figure 1:
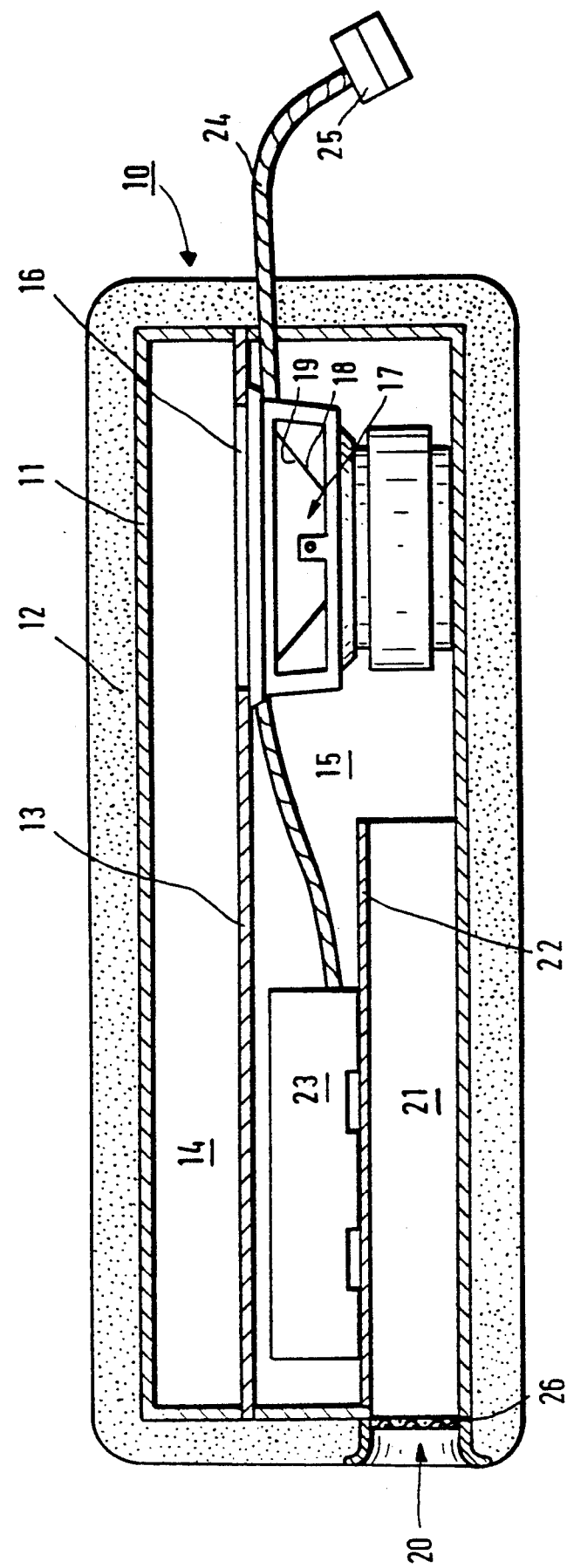
FIG. 1 is a cross-sectional view of a sub-woofer arrangement of the present invention integrated in the armrest of a vehicle.

Referring to FIG. 1, the external shape of sub-woofer arrangement 10 of the present invention is in the form of an armrest for a seat located in a passenger compartment of a vehicle and includes a housing 11. The housing 11 is sized so as to have an internal volume of approximately eight lifers. The exterior of the housing 11 is covered by upholstery 12 and, if the interior volume of the housing 11 is restricted to eight liters, the thickness of upholstery 12 can be varied so as to fit into a variety of vehicles.

The housing 11 defines an enclosure which is divided by, a partition 13 into a closed volume or first chamber 14 and a bass reflex volume or second chamber 15. An opening or aperture 16 is provided in partition 13. A bass loudspeaker 17, having an inside diaphragm surface 18 and an outside diaphragm surface 19, is fitted into opening 16 so that outside diaphragm 19 faces towards closed volume 14.

A sound outlet orifice 20 is provided on a portion of housing 11. The sound outlet orifice 20 connects a bass reflex channel 21, which is defined by wall 22 positioned within bass reflex volume 15, to the passenger compartment of the vehicle. The wall 22 is fabricated from sheet metal and provides a cooling path for an amplifier 23 arranged thereon. Cable 24 and plug 25 provide electrical connection to the amplifier 23. The plug 25 facilitates rapid electrical connection of the present invention to a vehicle when the present invention replaces an existing armrest in a vehicle. The loudspeaker 17 is electrically connected to the amplifier 23 by appropriate electrical connections (not shown). A grating 26 is positioned over the sound outlet orifice 20 so as to prevent the ingress of articles into the interior of housing 11.

Figure 2:
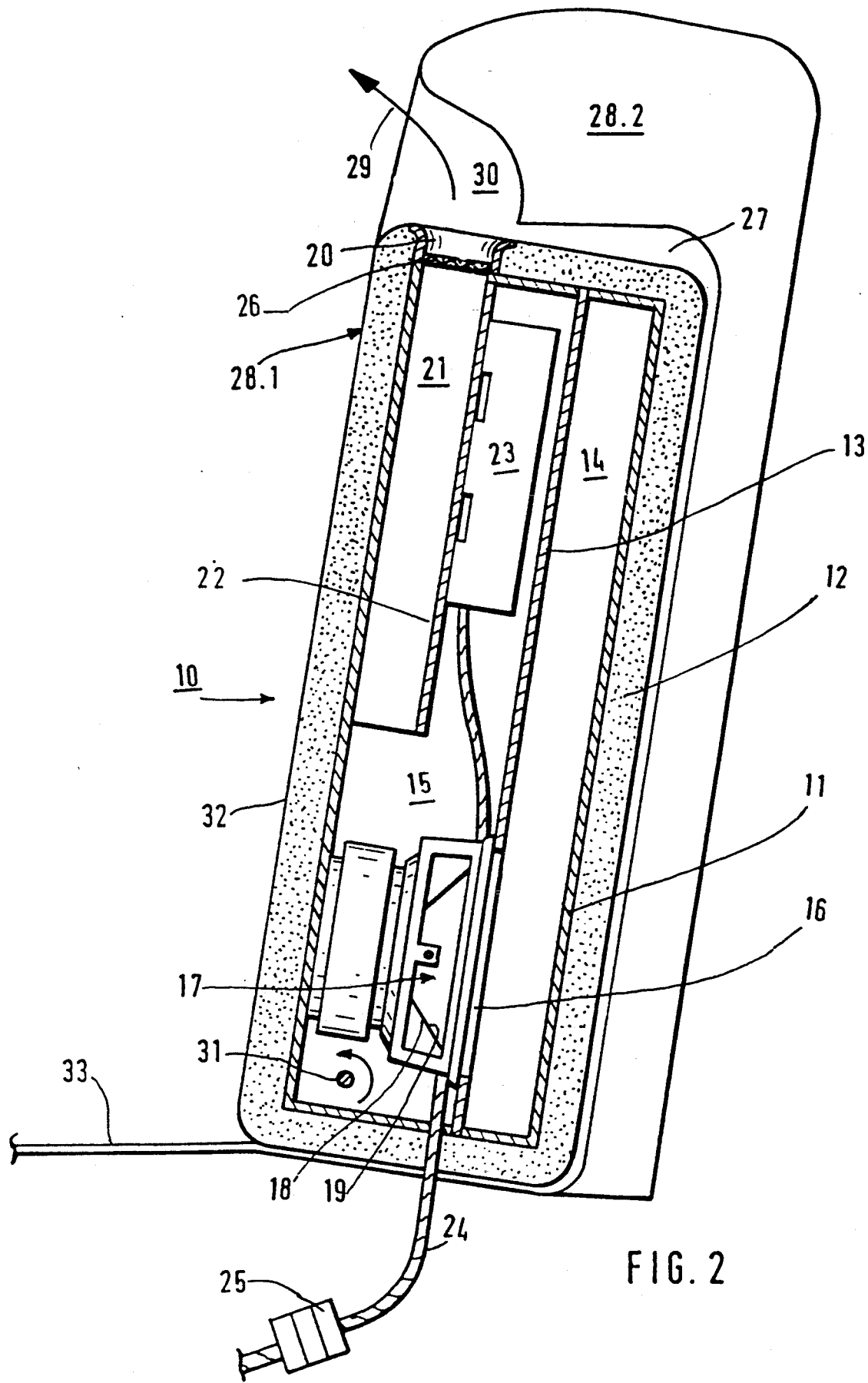
FIG. 2 is a view of a vehicle seat with the sub-woofer arrangement of FIG. 1 in its raised position within a seat recess.

Referring to FIG. 2, the armrest sub-woofer arrangement 10 is shown in an upward or vertical position within a companion recess 27 of a seat. In this position, the bass reflex channel 21 is approximately parallel to plane 28.1 of backrest element 28.2. When the armrest sub-woofer arrangement 10 is in the recess 27, sound quality is not impaired because sound outlet orifice 20 and bass reflex channel 21 are positioned proximal to shaped portion 30 of the recess 27. The shaped portion 30 permits the egress of sound in the direction of arrow 29. A pivoting member 31 is provided for pivoting the armrest sub-woofer arrangement 10 between its horizontal and vertical positions. When the armrest sub-woofer arrangement 10 is horizontally positioned, side 32 makes contact with seat surface 33 and outlet orifice 20 faces toward a dashboard (not shown) of the vehicle.

Thus, it can be seen that the present invention provides a unique armrest sub-woofer arrangement for the reproduction of bass tones in the passenger compartment of a vehicle.

The invention as described above admirably achieves the objects of the invention; however, it will be appreciated that the departures can be made by those skilled in the art without departing from the spirit and scope of the invention, which is limited only by the following claims.

What is claimed is:

1. An arrangement for reproducing bass tones in a passenger compartment of a vehicle, comprising:
   a housing defining an enclosure, and being arranged in an armrest of a vehicle, said housing including a sound outlet orifice positioned thereon so as to provide a sound pressure outlet from said enclosure to the passenger compartment of the vehicle;
   a partition, within said housing, dividing said enclosure of said housing into a first chamber and a second chamber, said partition including an aperture therein;
   a loudspeaker positioned adjacent to said aperture of said partition;
   means for mounting said armrest in the vehicle for movement between a first position and a second position; and
   a seat element, within the passenger compartment of the vehicle, having a recess therein, said recess being dimensionally sized to allow placement of said armrest therein when said armrest is in said second position, said recess including a cavity adjacent to said sound outlet orifice when said armrest is placed in said second position within said recess so as to prevent the covering of said orifice by said seat element.

2. The arrangement of claim 1, wherein the sound outlet orifice is positioned on said housing to face a dashboard of the vehicle when said housing is in a first position.

3. The arrangement of claim 1, further comprising a wall extending from said sound outlet orifice into said second chamber of said enclosure such that said wall and a portion of said housing form a bass reflex channel within said second chamber.

4. The arrangement of claim 3, further comprising an amplifier positioned on said wall within said enclosure, said amplifier being adapted for electrical connection to a source of electrical power, connection to an audio signal source and connection to a loudspeaker.

5. The arrangement of claim 4, wherein at least a portion of said wall is fabricated from sheet metal, said amplifier positioned on said sheet metal portion so as to dissipate heat from said amplifier by conduction of heat to said sheet metal and convection of heat from said sheet metal wall through said bass reflex channel.

* * * * *